INVENTOR
BENNIE G. PERDUE

United States Patent Office 3,439,245
Patented Apr. 15, 1969

3,439,245
ROTOR SPEED SENSING CIRCUIT
Bennie G. Perdue, Roanoke, Va., assignor to General
Electric Company, a corporation of New York
Filed Feb. 28, 1967, Ser. No. 619,335
Int. Cl. H02p 1/26
U.S. Cl. 318—237                              8 Claims

ABSTRACT OF THE DISCLOSURE

A rotor sped sensing circuit including a pulse generator which recieves a rectified input from a wound rotor in a motor and produces a pulse just prior to the end of each cycle of rectified rotor voltage. Each pulse drives a reset transistor into saturation to discharge a capacitor in a ramp function generator circuit. A voltage sensitive device responds to the capacitor voltage. Since the capacitor discharge rate is a function of rotor voltage frequency, the maximum or average magnitude of the capacitor voltage indicates rotor voltage frequency and, assuming a constant stator frequency, rotor speed.

Background of the invention

The present invention pertains to wound rotor electric motors and more particularly to a rotor speed sensing circuit for use with such motors.

Where alternating current machines such as induction motors or synchronous motors are used in certain applications, it is necessary that the rotor speed of the motor be accurately sensed to permit precise control of the motor. Attempts have been made to sense rotor speed by detecting the rotor voltage caused by the slipping of the rotor; i.e., the relative movement between the rotor and the rotating electric field established on the stator. An example of rotor slipping is where the electric field rotates about the stator at 60 revolutions per second (r.p.s.) while the rotor rotates at 58 r.p.s. due to a heavy load. Rotor voltage sensing circuits have not proven to be completely satisfactory for the following reasons. The rotor voltage developed at a particular slip varies widely not only with variations in motor design, thus necessitating the tailoring of rotor voltage sensing circuits to a specific motor design, but also within an individaul motor with changes in load current or ambient temperature. Even though a rotor voltage sensing circuit is tailored to a particular motor design and is calibrated so as to operate accurately under one set of conditions, any change in those conditions may have a detrimental effect on the accuracy with which the voltage sensing circuit detects rotor speed. Furthermore, voltage sensing circuits must be designed to take into account the fact that the rotor voltage is not linear with motor speed. As a result, such voltage sensing circuits may contain design compromises which will prevent them from being completely accurate at any motor speed.

Summary of the invention

The present invention makes possible motor speed sensing circuits which avoid the defects and inaccuracies which invariably accompany the use of rotor voltage sensing circuits. Circuits are used which are responsive to the frequency of the induced rotor voltage and which act to produce a voltage signal having a magnitude proportional to the speed of the rotor. The frequency of the rotor current is determined by the relative speeds of the rotor and of the electric field established on the stator. Unlike the magnitude of the rotor voltage, the frequency of the rotor voltage is independent of variations in motor design, load current, temperature, and line voltage. Although the frequency of the rotor voltage is dependent upon the frequency of the voltage applied across the stator, variations in the frequency of the stator voltage are generally quite small. Whereas the frequency of a line voltage may vary ±2% from an average frequency, the magnitude of that line voltage may vary by ±10% from an average magnitude.

The circuits for sensing the rotor frequency and for converting the sensed signal to a voltage variable signal include a ramp function generating circuit which produces a ramp function voltage; i.e., a voltage which increases linearly with time. The motor rotor is electrically connected to a pulse generating circuit which produces pulses just prior to the end of each half cycle of the rotor voltage. The pulses generated are applied to a ramp function reset circuit, the function of which is to cause the ramp function generating circuit to reset and to begin generating a new ramp function voltage at each pulse. Since the magnitude which the ramp function voltage attains between pulses is determined by the frequency of the pulses and thus the frequency of the field voltage, it is indicative of the rotor speed. If the frequency of the voltage applied to the stator is relatively constant, this attained magnitude or the average magnitude of the ramp function voltage can be used as an indication of the absolute speed of the rotor.

Description of the drawings

While the specification concludes with claims particularly pointing out and distinctly claiming that which is regarded as the present invention, the details of the invention along with its further objects and advantages may be more readily ascertained from the following detailed description when read in conjunction with the accompanying drawings in which:

Detailed description

Figure 1:
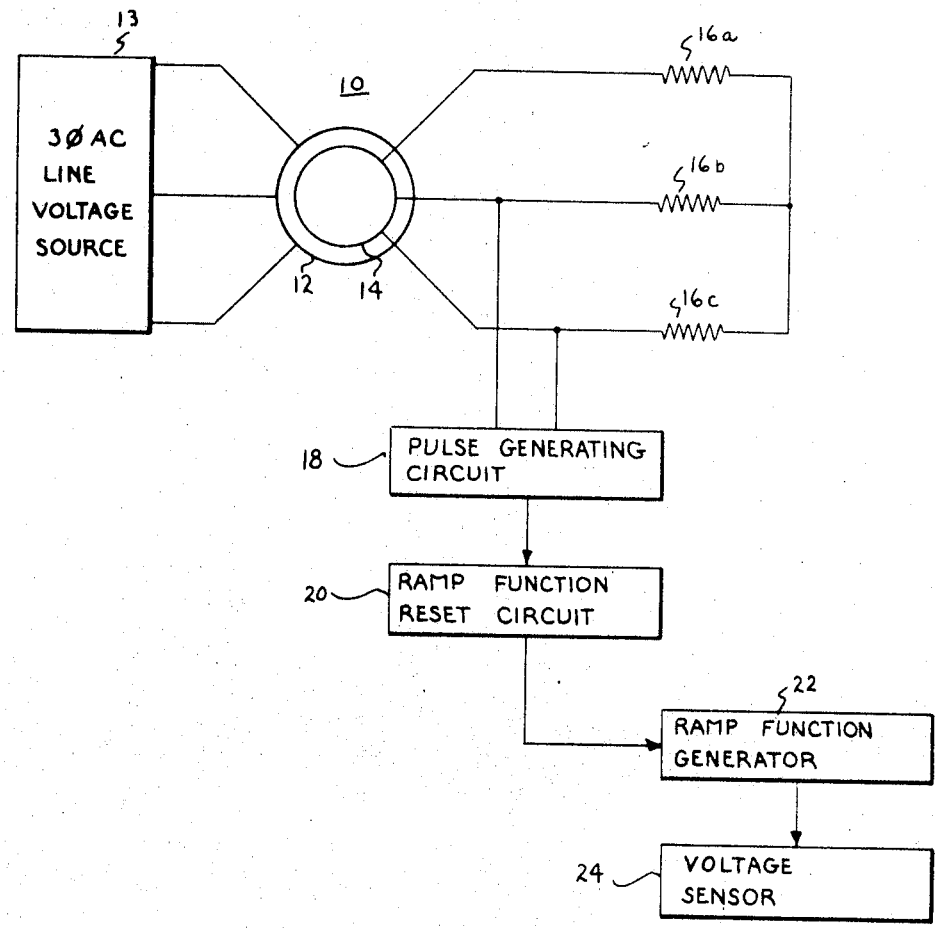
FIGURE 1 is a block diagram showing the relation of the various circuits of the present invention.

Referring now to FIGURE 1, a wound rotor induction motor 10 shown there includes a stator 12 adapted to be energized by a three-phase A-C line voltage source 13 and a wound rotor 14 having resistances 16a–16c. If the rotor 14 is moving more slowly than the stator field established by the three-phase A-C source 13, a current is induced in the conductors of the wound rotor 14. This induced current establishes an A-C rotor voltage which is applied to a pulse generating circuit 18 in which pulses are generated just prior to the end of each half cycle of the rotor voltage. The generated pulses are applied to a ramp function reset circuit 20 which, in turn, acts upon a ramp function generator circuit 22. The ramp function generator circuit 22 produces a ramp function voltage which continually increases linearly when the ramp function reset circuit 20 is not functioning. When the reset circuit 20 acts upon the generator circuit 22, the ramp function voltage is driven to zero and the generator circuit 22 begins to generate a new ramp function voltage.

Since the maximum attained magnitude or the average magnitude of the ramp function voltage depends upon the frequency with which the reset circuit 20 acts upon the generator circuit 22 and the frequency with which the reset circuit 20 acts is, in turn, dependent on the frequency of the rotor voltage, both the maximum attained magnitude of the ramp function voltage prior to reset and the average value of the ramp function voltage are inversely proportional to the frequency of the rotor voltage. Assuming that the frequency of the voltage applied to the stator 12 by the source 13 is relatively constant, the maximum and average values of the ramp function voltage are also indicative of the rotor speed. A voltage sensor 24 responds to a predetermined characteristic of the ramp function voltage such as its maximum or its average value to produce, under specified conditions, an output for a motor control circuit or an indicator.

Figure 2:
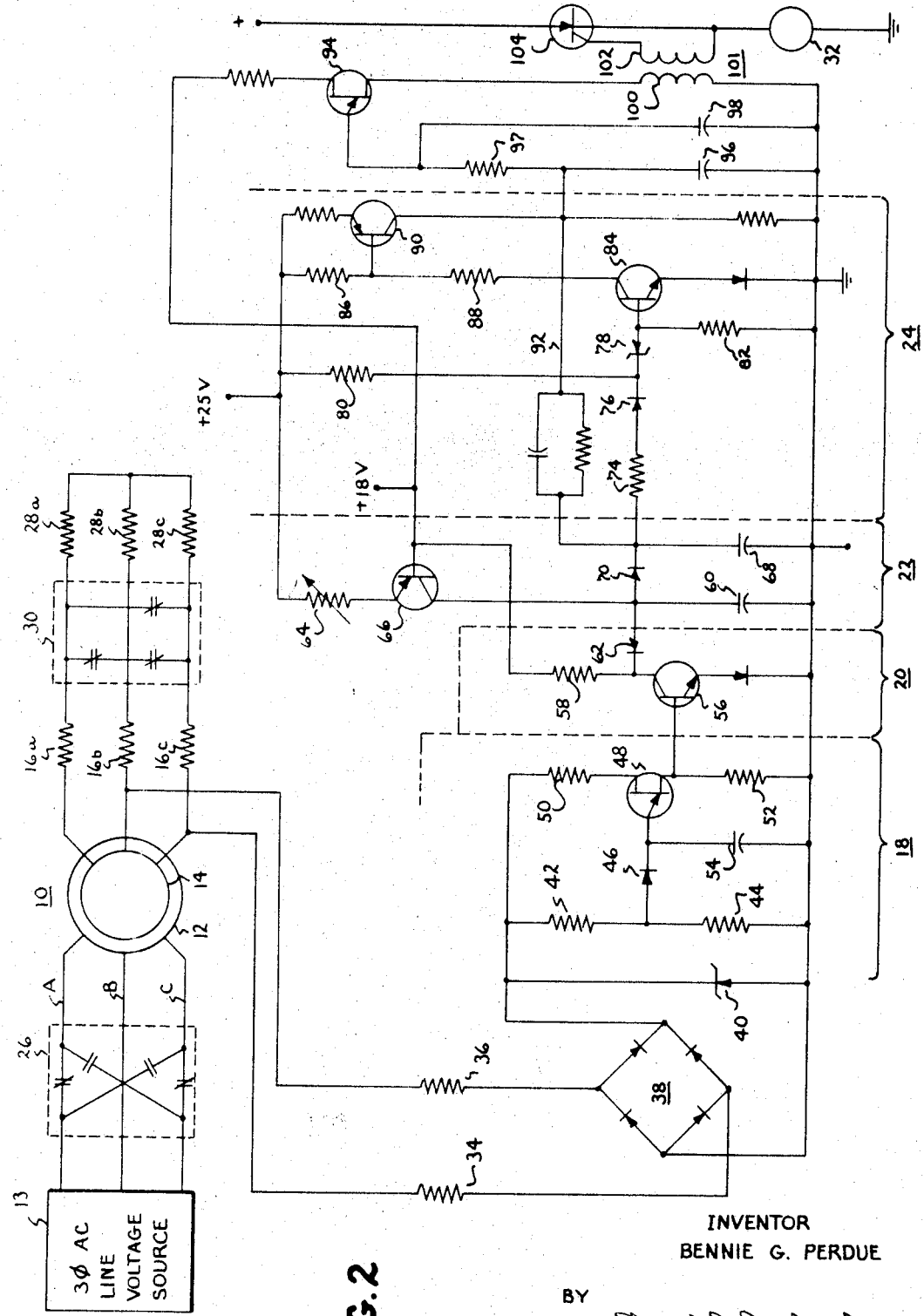
FIGURE 2 is a schematic diagram of a circuit representing a specific embodiment of the present invention.

In FIGURE 2, a rotor speed sensing circuit constructed in accordance with the concepts of the present invention is shown in detail in combination contact-controlling circuitry for altering the speed-torque characteristic for an electric motor when that motor is stalling out or is reversed.

In the particular system shown in FIGURE 2, a set 26 of directional contactors is located in the power lines A, B, and C leading to the stator 12 of the motor 10. When the contacts in the set 26 are in the condition shown, an electric field established by the three-phase A-C voltage source 13 in the stator 12 travels about the circumference of the stator 12 in one direction. However, if the condition of the contacts on the set 26 is changed by opening the normally closed contacts in lines A and C and closing the normally open contacts joining lines A and C, the electric field travels about the stator circumference in the opposite direction. Immediately after the contacts in the set 26 are switched from their previous condition, the electric field in the stator begins to rotate at a speed determined by its frequency and in the direction determined by the phase rotation of the A-C voltage source 13. However, the rotor 14 continues to rotate at the same speed and in the same direction that it did just prior to the reversing of the contacts. The stator field must drag the rotor 14 to a stop and cause it to accelerate in the opposite direction to the running speed of the motor.

When the contacts in the set 26 change state, the motor operates on an accelerating speed-torque curve which minimizes motor heating and reduces motor torque to prevent damage to the drive train in which the motor is connected. One way of causing this shift between a running speed-torque curve and the accelerating speed-torque curve is to add a set of resistances 28a–28c in series with the regular rotor winding resistors 16a–16c. Contacts in a rotor contact set 30 are normally held closed by the continuous energization of a contact actuator 32 seen at the right side of the FIGURE 2. If the actuator 32 is de-energized for a predetermined period of time, the normally closed contacts in the set 30 are permitted to open to bring the resistors 28a–28c into the rotor circuit. The rotor speed sensing circuit produces an output signal which controls the energization of the actuator 32 and thus the speed-torque characteristic of the motor 10.

An input voltage to the rotor speed sensing circuit is supplied to conductors 34 and 36 which are electrically connected to adjacent conductors in the rotor winding. Each full cycle of the induced rotor voltage is rectified by a four-way diode bridge 38 and is applied across a voltage limiting Zener diode 40 and a voltage divider comprising a pair of resistors 42 and 44, having the anode of a diode 46 connected to their common junction. The cathode of the diode 46 is connected to the emitter terminal of a unijunction transistor 48, having a first base terminal conected to the lower end of a resistor 50 and a second base terminal connected to the upper end of a resistor 52. A charging capacitor 54 is connected between the cathode of the diode 46 and the lower end of the resistor 44.

The second base terminal of the unijunction transistor 48 is conected directly to the base of a transistor 56 in the ramp function reset circuit 20. The transistor 56, which is biased by an 18 volt DC source through a collector resistor 58, is connected in parallel with a charging capacitor 60 which is one element of the ramp function generator circuit 22. The generator circuit 22 also includes a variable resistor 64 in the emitter circuit of a transistor 66, the base of which is connected directly to the 18 volt DC source. The transistor 66 acts as a constant current source for the charging capacitor 60 which is also connected in parallel with capacitor 68 through a diode 70. The upper terminal of the capacitor 68 is connected to a resistor 74 in series with a diode 76 and an inversely-poled Zener diode 78.

The cathode of the Zener diode 78 is connected to a 25 volt DC source through a biasing resistor 80, whereas its anode is connected to ground through a resistor 82 as well as to the base of a transistor 84. The transistor 84 is biased by the 25 volt DC source through a collector voltage divider consisting of a pair of resistors 86 and 88. The base terminal of a transistor 90 is connected to a common junction of resistors 86 and 88. The collector of the transistor 90 is connected through a feedback loop 92 to the upper terminal of the capacitor 68 and is further connected to an oscillator including a unijunction transistor 94 with a pair of capacitors 96 and 98 connected to its emitter terminal, a resistor 97, and a primary winding 100 of a pulse transformer 101. The secondary winding 102 of the pulse transformer 101 is connected between the gate and the cathode of an SCR 104 connected in series with the actuator 32.

Under ideal conditions, the rotar 14 rotates at the same speed as the electric field established in stator 12 and there is no induced rotor voltage. In the absence of an induced voltage, the capacitor 54 remains uncharged, and the unijunction transistor 48 is in its blocking or nonconducting condition. Transistor 56 is also in its blocking condition since the potential on its base terminal is essentially at ground. The charging capacitor 60 and the capacitor 68 will have charged to the maximum value permitted by the constant-current transistor 66. Under these conditions, the voltage on the capacitors 60 and 68 exceeds the reverse breakdown voltage of the Zener diode 78 and current is conducted through Zener diode 78 to the base terminal of transistor 84. When the transistor 84 conducts, the potential at the common junction of the resistors 86 and 88 becomes lower, thereby causing transistor 90 to conduct heavily. The transistor 84 is driven into saturation by current flowing from the collector of the transistor 90 through the feedback loop 92 to the upper terminal of the capacitor 68. The transistor 90 also supplies current to the oscillator 93, which oscillates at a predetermined frequency determined by the RC time constant of capacitor 98 and resistor 97. When the oscillator is functioning, an A-C voltage is established in the secondary winding 102 of the pulse transformer 101 which causes the gate terminal of SCR 104 to become positive relative to its cathode terminal. The SCR 104 fires on each positive half cycle to cause the contact actuator 32 to be intermittently energized. The continuous intermittent energization of the contact actuator 32 acts to hold the contacts in the set 30 in their closed position.

When the rotor 14 begins to slip relative to the electric field established in the stator 12, induced rotor voltages appear across the conductors 34 and 36. These voltages which are rectified by the full wave diode bridge 38 and are clipped by the Zener diode 40, cause current to flow through the resistor 42 and the diode 46 to the charging capacitor 54, which accumulates a charge determined by the reverse breakdown voltage of the Zener diode 40 and the relative magnitudes of the resistors 42 and 44. Even though the applied voltage exceeds the reverse breakdown level of the Zener diode 40, the voltage on the capacitor 54 is insufficient to cause the firing of the unijunction transistor 48 until the voltage across the base terminals of the unijunction transistor 48 begins to decay at the end of each cycle of rectified rotor voltage. Just prior to the end of the cycle, the voltage established across the capacitor 54 is great enough relative to the interbase potential of the unijunction transistor 48 to cause that transistor to fire, thereby discharging the capacitor 54 through the resistor 52.

The discharge of the capacitor 54 through the resistor 52 causes a temporary voltage buildup across that resistor which, in turn, causes the reset transistor 56 to saturate.

When the reset transistor 56 saturates, the charging capacitor 60 in the ramp function generator circuit 22 discharges through diode 62 and transistor 56 to ground. At the same time, capacitor 68 begins to discharge through the Zener diode 78 and transistor 84 to ground. The rate of discharge is such that if the frequency of the induced rotor voltage is less than a predetermined triggering frequency, the current supplied by the constant-current transistor 66 causes capacitor 68 to begin charging again before the voltage across that capacitor can decay to a voltage less than the reverse breakdown voltage of the Zener diode 78. Under these conditions, the transistors 84 and 90 continue to conduct and to supply the oscillator 93 with power. As a consequence the SCR 104 conducts on positive half cycles to continuously intermittently energize the contact actuator 32 to cause the condition of the contacts in the set 30 to remain unchanged.

However, when the frequency of the rotor voltage increases substantially as it does when the rotor 14 began to stall under a heavy load or when the contacts in the set 26 are switched to reverse the direction of rotation of the motor, the unijunction transistor 48 is driven into conduction frequently as is the reset transistor 56. The frequent saturation of the reset transistor 56 and the consequent frequent discharge of capacitor 60 prevents the constant current source transistor 66 from charging the capacitor 60 to a voltage which, in combination with the voltage across the capacitor 68, exceeds the reverse breakdown voltage of the Zener diode 78. With the Zener diode 78 in its blocking condition, the voltage at the base terminal of the transistor 84 falls to a potential near ground to cause that transistor to become nonconductive. The subsequent increase in the potential at the base terminal of transistor 90 causes that transistor to become nonconductive, thereby cutting off the power supplied to the oscillator 93.

As the oscillator voltage degenerates, the voltage established across the secondary winding 102 of the pulse transformer 101 also degenerates. When the oscillator voltage and the secondary voltage have degenerated to zero, the voltage at the gate terminal of the SCR 104 is at substantially the same potential as that on the cathode terminal. As a result, the SCR remains in its blocking condition at all times. The subsequent de-energization of the contact actuator 32 causes the contacts in the set 30 to open, thereby bringing resistors 28a–28c into the rotor circuit for the motor 10. As was brought out above, the addition of these resistances alters the speed-torque characteristic of the motor to one which minimizes motor heating and reduces torque. As the rotor 14 accelerates toward its running speed, the frequency of the induced rotor voltage declines and the unijunction transistor 48 fires less frequently, thus causing the capacitor 60 to be discharged less frequently. When the rotor voltage frequency falls below a predetermined frequency, the potential on the capacitors 60 and 68 builds up to and remains at levels which exceed the reverse breakdown voltage of the Zener diode 78 at all times. Power is continually supplied to the oscillator 93 and ultimately to the contact actuator 32 under these circumstances.

The rotor speed sensing circuit described above produces a voltage at the upper terminal of the capacitor 60 which permits precise motor control due to the fact that the capacitor 60 is discharged only just prior to the end of each cycle of rectified rotor voltage, rather than at some indefinite time during the cycle. The uniformity of the discharge time is achieved by properly selecting the ratio of the resistors 42 and 44 in the voltage divider in the pulse generator circuit 18 so that the voltage which builds up across capacitor 54 can not trigger unijunction transistor 48 until the interbase potential of that transistor falls off near the end of each cycle of rectified rotor voltage. Any charge which builds up across the capacitor 54 can be discharged only through the unijunction transistor 48 since the diode 46 prevents discharge through the resistor 44.

Although the foregoing description of a preferred embodiment of a rotor speed sensing circuit has shown it in combination with contact control circuitry, it is obviously not necessary that it be so used. For example, since the attained or average magnitude of the ramp function voltage is related to the rotor voltage frequency and thus rotor speed, a voltage sensitive indicating device such as a tachometer may be used to indicate rotor speed directly. Therefore, it is intended that the appended claims shall cover all such modifications as fall within the true spirit and scope of the invention.

I claim:
 1. For use with an electric motor having a stator and a rotor, a rotor speed sensing circuit including:
  (a) a ramp function generator circuit for producing a ramp function voltage;
  (b) a pulse generating circuit electrically connected to the rotor for producing pulses just prior to the end of each half cycle of induced rotor voltage at a rate determined by the frequency of the induced rotor voltage;
  (c) reset means actuated by each of the pulses for acting upon said ramp function generator circuit to drive the ramp function voltage toward zero; and
  (d) voltage sensitive means connected to said ramp function generator circuit responsive to a predetermined characteristic of the ramp function voltage for producing an output signal.
 2. A rotor speed sensing circuit as recited in claim 1 wherein said pulse generating circuit includes:
  (a) means for rectifying the induced rotor voltage;
  (b) a threshold device connected across said rectifying means, said threshold device having a control terminal and an output terminal;
  (c) a capacitor connected to said control terminal; and
  (d) means for applying a part of the rectified rotor voltage across said capacitor, the biasing of said threshold device being such that the energy stored by said capacitor causes an electrical breakdown of said threshold device only when the rectified rotor voltage falls just prior to the end of each cycle of rectified rotor voltage.
 3. A rotor speed sensing circuit as recited in claim 1 wherein said pulse generating circuit includes:
  (a) means for rectifying the induced rotor voltage;
  (b) a voltage limiting diode connected across said rectifying means to limit the magnitude of the induced rotor voltage;
  (c) a voltage divider connected in parallel with said voltage limiting diode, said voltage divider having first and second serially-connected resistors;
  (d) a unijunction transistor having an emitter terminal and first and second base terminals connected to the opposite ends of said voltage divider and an emitter terminal;
  (e) a capacitor connected between said emitter terminal and one end of said voltage divider; and
  (f) a diode connected between the emitter terminal and the common junction of said first and said second resistor to allow current to flow toward the emitter terminal.
 4. A rotor speed sensing circuit as recited in claim 1 wherein said ramp function generator circuit includes:
  (a) a charging capacitor;
  (b) a resistance connected in series with said charging capacitor; and
  (c) a constant current source comprising a transistor having its collector and emitter terminals connected serially with said charging capacitor and said resistance and its base terminal connected to a fixed unipotential voltage source.

5. A rotor speed sensing circuit as recited in claim 2 wherein said ramp function generator circuit includes:
  (a) a charging capacitor;
  (b) a resistance connected in series with said charging capacitor; and
  (c) a constant current source comprising a transistor having its collector and emitter terminals connected serially with said charging capacitor and said resistance and its base terminal connected to a fixed unipotential voltage source.

6. A rotor speed sensing circuit as recited in claim 5 wherein said reset means includes a switching device connected across said charging capacitor in said ramp function generator circuit and having a control terminal connected to the output terminal of said threshold device in said pulse generating circuit, said second switching device being driven into a conducting state upon firing of said threshold device.

7. A rotor speed sensing circuit as recited in claim 4 wherein said voltage sensitive means is responsive to the voltage on said charging capacitor.

8. A rotor speed sensing circuit as recited in claim 5 wherein said voltage sensitive means is responsive to the voltage on said charging capacitor.

References Cited

UNITED STATES PATENTS

| 2,165,491 | 7/1939 | Leitch | 318—240 XR |
| 2,567,473 | 9/1951 | Dawe | 318—240 XR |
| 2,717,349 | 9/1955 | Lee | 318—237 |

ORIS L. RADER, *Primary Examiner.*

G. Z. RUBINSON, *Assistant Examiner.*

U.S. Cl. X.R.

318—240, 490